Dec. 3, 1968 P. MÜLLER 3,414,885

DISTINGUISHING MATRIX THAT IS CAPABLE OF LEARNING, FOR ANALOG SIGNALS

Filed Feb. 11, 1964 5 Sheets-Sheet 1

INVENTOR
PETER MÜLLER

BY Percy P. Lantzy
ATTORNEY

Dec. 3, 1968 P. MÜLLER 3,414,885

DISTINGUISHING MATRIX THAT IS CAPABLE
OF LEARNING, FOR ANALOG SIGNALS

Filed Feb. 11, 1964 5 Sheets-Sheet 2

INVENTOR
PETER MÜLLER

BY Percy P. Lantzy
ATTORNEY

INVENTOR
PETER MÜLLER
BY Percy P. Lantzy
ATTORNEY

Dec. 3, 1968 P. MÜLLER 3,414,885

DISTINGUISHING MATRIX THAT IS CAPABLE
OF LEARNING, FOR ANALOG SIGNALS

Filed Feb. 11, 1964 5 Sheets-Sheet 4

INVENTOR
PETER MÜLLER

BY Percy P. Lantzy
ATTORNEY

INVENTOR
PETER MÜLLER

BY Percy P. Lantzy
ATTORNEY

United States Patent Office 3,414,885

Patented Dec. 3, 1968

3,414,885

DISTINGUISHING MATRIX THAT IS CAPABLE OF LEARNING, FOR ANALOG SIGNALS

Peter Müller, Karlsruhe, Germany, assignor to International Standard Electric Corporation, New York, N.Y., a corporation of Delaware Filed Feb. 11, 1964, Ser. No. 344,119
Claims priority, application Germany, Feb. 20, 1963, St 20,319
10 Claims. (Cl. 340—172.5)

The present invention relates to a matrix-type of circuit arrangement that is able to "learn," and which differs from the hitherto conventional types of arrangements, especially from the arrangement which has become known as a perception matrix (learning matrix for analog signals) in that it is capable of recognizing different patterns which have been derived from a standard pattern by way of affine transformation. The perception matrix is incapable of doing this.

The perception matrix is a further embodiment of the so-called learning matrix. The latter, in its most simple form, consists of an $m$-by-$n$ matrix, at the intersecting points of which there are arranged elements capable of assuming two different magnetic states. If, to the $n$ columns, there is applied a binary pattern of $n$ values, and if simultaneously there is energized one row, then the elements arranged at the intersecting points will assume the values of the binary pattern (learning phase). Similarly, other patterns are "learned" into the other rows. During the "confirming" or "learned" phase, one of the "learned-in" patterns is applied to the columns and, with the aid of a maximum-detection circuit connected to all rows, it is determined which of the rows contains the maximum energization, in other words: which row pattern is equal to the offered one.

In the case of the perception matrix, the connecting elements capable of assuming two states are replaced by such ones which, in the ideal case, are capable of being set continuously either irreversibly or reversibly. With the aid of control circuits which are assigned to each column, and which due to the controlling of the entire matrix are only effective with respect to the connecting element of the respective row, the connecting elements of one row are exactly set to the given value during the learning phase. During the confirming or learned phase, the perception matrix operates in a way similar to the learning matrix.

Such an arrangement, however, has disadvantages, as shown in the following.

A pattern $\{a\}_i$ with the current number $i$, and which is composed of a set of $n$ analog features (e.g. voltages, currents), so-called attributes, may be expressed by the following equation:

$$\{a\}_i=(a_{i1} \ldots a_{i\nu} \ldots a_{in}) \qquad (1)$$

From the pattern comprising the number $i=1$, and by way of an affine transformation, that is, multiplication of each attribute with the same factor, there will result another pattern which is assigned to the same pattern shape or class of significance:

$$\{\alpha\}_{1a}=K_1(\alpha_{11} \ldots \alpha_{1\nu} \ldots \alpha_{1n})$$

or a further pattern, such as:

$$\{a\}_{1b}=K_2(a_{11} \ldots a_{1\nu} \ldots a_{1n})$$

Hence, all of these patterns from the basic pattern upon which an affine transformation has taken place belong to the same class of significance. When considering patterns which are assigned to other classes of significance, then these may be represented as follows:

$$\{a\}_2=(a_{21} \ldots a_{2\nu} \ldots a_{2n}) \qquad (2)$$

or $$\{a\}_{2a}=L_1(a_{21} \ldots a_{2\nu} \ldots a_{2n})$$

$$\{a\}_{2b}=L_2(a_{21} \ldots a_{2\nu} \ldots a_{2n})$$

wherein K and L indicate constant quantities which may be $\gtreqless 1$

The perception matrix is neither capable of separating the patterns $\{a\}_1$; $\{a\}_{1a}$; $\{a\}_{1b}$, nor the patterns $\{a\}_2$; $\{a\}_{2a}$; $\{a\}_{2b}$ from one another; in fact, during the confirming or learned phase, all patterns $\{a\}_1$ are assigned to the one class of significance, and all patterns $\{a\}_2$ are assigned to the other class of significance. Accordingly, at the output of the perception matrix, it is no longer possible to detect whether the pattern $\{a\}_1$ or $\{a\}_{1a}$ or $\{a\}_{1b}$ was the one given to the input. This has a considerable limiting effect upon the range of practical applications of the perception matrix. As an example, when controlling an industrial process by temperature, it is possible to use the pattern which was learned-in, e.g. a series of temperature values, for releasing certain processes. If the individual values of the learned-in pattern are all greater by the same factor, this will not be recognized, and severe damages caused by too high temperatures will result. Similar difficulties arise in other cases of practical applications of the perception matrix. A further disadvantage of the conventional arrangement is seen that with respect to these arrangements it is required that the individual patterns which are inputs to the matrix must be standardized; in other words, that all patterns must have the same energy.

These disadvantages are avoided by the distinguishing matrix. This matrix has the property that, from among the offered patterns, there is not only indicated the class of significance, but also the significance itself. The arrangement according to this invention does not set up any classes, in other words it does not assign to several patterns the same class of significance as is the case with a perception matrix, but distinguishes the patterns of the same class. Hence, it distinguishes e.g. between the patterns $\{a\}_1$, $\{a\}_{1a}$ and $\{a\}_{1b}$. With respect to various technical applications, the distinguishing matrix may be designed or built up in such a way that it only distinguishes among various patterns of one class of significance, or else among patterns of different classes of significance.

Before describing some examples of embodiment of the invention, consideration is given to the theoretical fundamentals for realizing the distinguishing matrix.

A distinguishing matrix is a matrix-type of circuit arrangement comprising $m$ rows and $n$ columns. At the intersecting points between rows and columns, connecting elements are arranged comprising an adjustable physical quantity having an information-processing function for temporarily storing information values indicative of a pattern shape or attribute. The transfer or information processing function of the connecting element at the intersecting point of the $i$th row and the $\nu$th column is referred to as the connection $\mathscr{K}_{i\nu}$. Upon feeding a pattern into the columns of the arrangement, each of the connecting elements will provide an energization contribution $\theta_{i\nu}$ towards the total energization $\theta_i$ of the $i$th row, with the total energization representing the sum of the energization contributions.

$$\theta_i=\sum_{\nu=1}^{n}\theta_{i\nu} \qquad (3)$$

The energization contribution $\theta_{i\nu}$ depends on the connection $\mathscr{K}_{i\nu}$ of the respective intersecting point, and on the attribute $a_{i\nu}$ of the offered pattern $\{a\}_{j\nu}$.

$$\theta_{iv}=f(a_{jv}:\mathscr{H}_{iv}) \quad (4)$$

The general idea in solving the problem in accordance with the invention consists in having the connection $\mathscr{H}_{iv}$ designed in dependence upon the attribute $a_{jv}$ of the pattern offered during the confirming or learned phase. The connection $\mathscr{H}_{iv}$ is set during the learning phase in dependence upon the attribute $a_{iv}$ of the pattern to be learned:

$$\mathscr{H}_{iv}=k\cdot a_{iv} \quad (5)$$

where $k$=factor of proportionality.

With respect to the energization contribution of the $i$th row, the following will finally result from Equations 4 and 5:

$$\theta_{iv}=f(a_{jv}\cdot a_{iv}) \quad (6)$$

The connecting element acts in such a way that $\theta_{iv}$ will become an extreme value with respect to that particular attribute $a_{iv}$ of the learned pattern $\{a\}_i$ having the smallest deviation from the respective attribute $a_{jv}$ of the offered pattern $\{a\}_j$. Since the total energization of the $i$th row represents the sum of all energization contributions made by the connecting elements of the $i$th row it will follow that the energization of that particular row will become an extreme or maximum value whose connecting elements provide maximum values of the energization contributions, due to the smallest deviation of the attributes of the offered pattern from the corresponding attributes of the learned patterns. A maximum detection circuit, connected to all rows of the arrangement, serves to detect the row with the maximum excitation, and to indicate this row. Hence if a repertory of different patterns has been learned, in other words, if the connections for the respective attributes of the patterns of the repertory have been set, and if after the termination of the learning phase (setting process) a pattern is again fed from this repertory into the columns of the matrix circuit, then the distinguishing matrix is capable of distinguishing the offered pattern from the remaining patterns of the repertory, and of indicating the significance assigned during the learning phase, without being hindered by the restriction of the perception matrix, namely without having the missing capability of distinguishing affine transformed patterns.

According to the present invention, there are used per intersecting point *two* connecting elements which are independent of one another, with the connections being so adjusted during the learning phase, and with the attributes of the pattern to be recognized being in such a way offered during the confirming or learned phase, that in each point of intersection there is constituted an energization contribution being in proportion to the difference between the offered and the learned (stored) attribute. This energization contribution will become zero if both attributes are identical.

According to the invention, the matrix type of circuit arrangement, capable of learning, for distinguishing several patterns existing as analog (non-binary) electric signals, which are capable of being assigned to one or more classes of significance, comprising $m$ rows and $n$ double columns, and in which to each row there is assigned a predetermined significance, is characterized by the fact that at the points of intersection of the double columns and the rows, there is provided for each column of the double columns one connecting element which is independent of the other column, and that the information-processing physical quantity of the connecting elements of the one column of the pair of columns is changed or varied in such a way during the learning phase that its connecting effect will be in proportion to the applied attribute, and that, during the confirming or learned phase, the attributes of the respective patterns are applied to the second column of the double column (pair of columns) with both connecting elements acting in such a way in common upon the row wire during the confirming or learned phase, that there will be formed the difference between the stored and the offered attribute, and that finally the sum of the differences of the one row is set up and, together with the correspondingly formed values of all other rows, is evaluated in a minimum detection circuit designed to respond to the smallest value.

For illustrating the general idea of the invention, there are considered two possible circuit arrangements which differ from one another. In the one arrangement, the values are used directly, whereas in the other arrangement operations are made with reciprocal values. With the aid of the second arrangement it is possible to obtain a sharper minimum. The use of a maximum detection circuit, responding to smallest values, has the added advantages in that measuring value can be amplified and, if so required, may be further examined.

The invention will now be explained in detail with reference to examples of embodiment shown in FIGS. 1–6 of the accompanying drawings, in which:

FIG. 1*a* shows several patterns belonging to one class of significance;

FIG. 1*b* shows several patterns belonging to another class of significance;

Figure 1B:
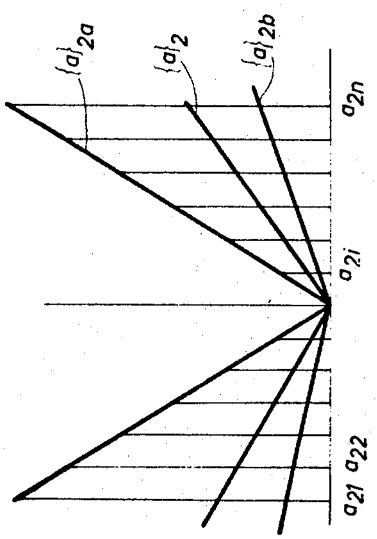
Figure 1A:
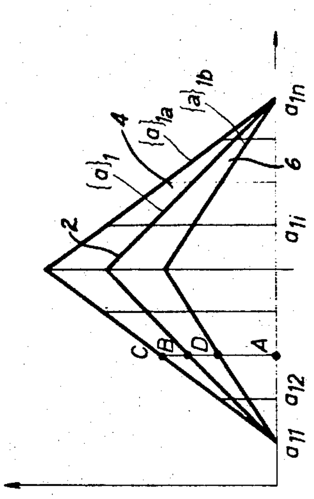

FIGS. 1*a* and 1*b* serve to explain the behavior of the distinguished matrix. The curve 2 indicated by $\{a\}_1$ in FIG. 1*a* is assumed to represent a random pattern consisting of $n$ analog values which are applied to the columns of the distinguishing matrix. The analog values, i.e. the attributes, are assumed to be, e.g., voltage amplitudes one of which is assumed to have the amount AB. Other patterns belonging to the same class of significance are 4, $\{a\}_{1a}$ and 6, $\{a\}_{1b}$. The amplitudes thereof, corresponding to the amplitude AB, are AC or AD respectively. Hence, it will be clearly seen that the patterns $\{a\}_{1a}$ and $\{a\}_{1b}$ have been derived by multiplying all amplitudes of the pattern $\{a\}_1$ with the same factor. The factor, with respect to the pattern $\{a\}_{1a}$, is greater, and with respect to the pattern $\{a\}_{1b}$, smaller than unity. FIG. 1*b* likewise shows three patterns which, however, belong to another class of significance.

Figure 2:
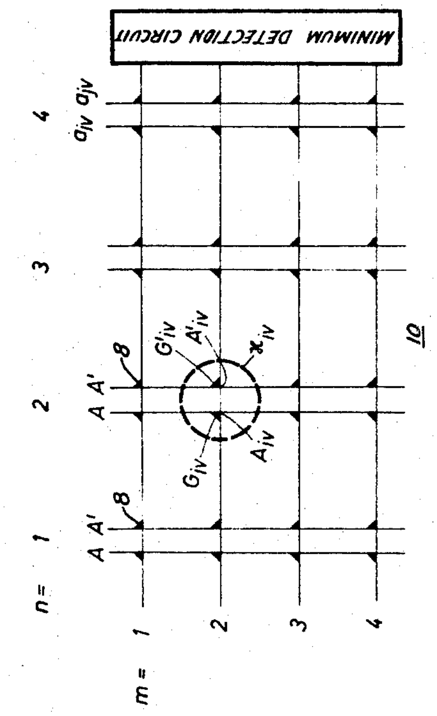
FIG. 2 shows a first example of a distinguishing matrix.

FIG. 2 shows the arrangement, in which conductances 8 are used as connecting elements, in a schematic representation. The distinguishing matrix 10 comprises $n$ double columns $A_{1 \ldots n}$ and $A'_{1 \ldots n}$, as well as $m$ rows $B_{1 \ldots m}$. Each "point of intersection," in the sense of the energization contribution, consists in this case of two points of intersection between the columns $A'_v$ and $A_v$ and the row $B_i$ containing the connections $\mathscr{H}_{iv}$ and $\mathscr{H}'_{iv}$. At each point of intersection, there is arranged a conductance $G_{iv}$ or $G'_{iv}$ respectively. The conductances $G'_{iv}$ are alike with respect to all points of intersection:

$$G'_{iv}=K.1;\ \begin{matrix} i=1, 2 \ldots m \\ v=1, 2 \ldots n \end{matrix} \quad (7)$$

During the learning phase, the attributes $a_{iv}$ of the pattern to be learned $\{a\}_i$ are represented by direct voltages of the value $a_{iv}$ volts, and are fed into the columns $A_v$ where they cause a setting of the conductances $G_{iv}$ in accordance with Equation 5:

$$G_{iv}=k.a_{iv};\ \begin{matrix} i=1, 2 \ldots m \\ v=1, 2 \ldots n \end{matrix} \quad (8)$$

During the confirming (learned) phase, the attributes $a_{jv}$ of the offered patterns $\{a\}_j$ are fed into the columns $A'_v$, with a negative voltage amounting to −1 volt being applied simultaneously to the columns $A_v$.

The conductances per double connecting point are shown in Table I below.

TABLE I

| | $G_{iv}$ | $G'_{vi}$ |
|---|---|---|
| Learning phase | $k.a_{iv}$ | k.1 |
| Confirming phase | −1 | $a_{jv}$ |

In this way, the energization contributions $\theta_{iv}$ will result in the currents as follows:

$$\theta_{iv}=I_{iv}=-k.a_{iv}+k.a_{jv}=k(a_{jv}-a_{iv}) \quad (9)$$

and the total energization per row becomes a current $$I_i=k\sum_{v=1}^{n}1(a_{jv}-a_{iv}) \quad (10)$$

The energizations of the individual rows $$I_i(i=1,\ 2,\ 3\ldots m)$$

are applied to the minimum detection circuit 1 by which there is determined the row with the smallest energization. The output signal is then available for further use.

Figure 3:
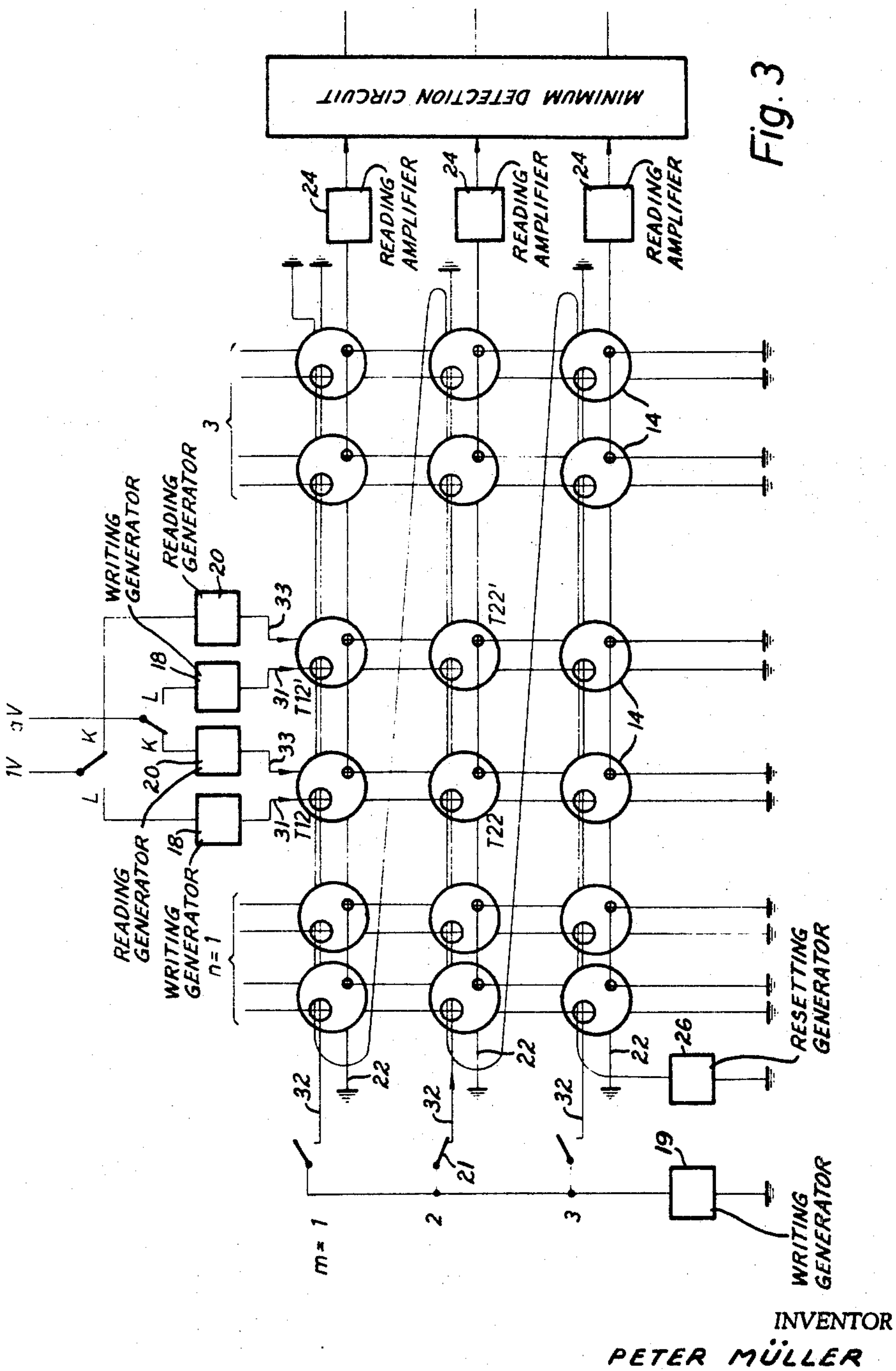
FIG. 3 shows a practical embodiment of the distinguishing matrix according to FIG. 2.

The physical embodiment of the arrangement according to FIG. 2 is shown in FIG. 3.

Transfluxors 14 are used as connecting elements; two transfluxors $T_{iv}$ and $T'_{iv}$ along the row, together with a double column, constitute a point of intersection in the sense of the maximum detection circuit. During the learning phase (switch position L), the attributes of the pattern to be learned, and represented by *a* volt, on conductor 16 are fed to the writing generators 18, where they are proportionally converted into current pulses which, in coincidence with the current pulses of the writing generator 19 which is connected to one row by the closure of the switch 21, with the row representing the significance of the pattern to be learned, produce the setting of the transfluxors $T'_{iv}$ of the selected row via the writing windings 31 and 32. In the same way, the transfluxors $T_{iv}$ of the same row are set in accordance with the value of 1 volt as applied to the columns. During the confirming phase (switching position K), the attributes of the offered pattern are fed to the reading generators 20 where they are proportionally converted into alternating currents of high frequency by which, via the interrogation wires 33, all of the transfluxors are read in a non-destructive manner. The reading wires 22 connect all transfluxors of one row; in these wires there are produced the row excitations, with the transfluxors $T'_{iv}$ producing negative energization contributions due to the oppositely directed sense of winding of the reading wires, thus causing in the "point of intersection" the formation of a difference between the learned and the offered attributes. The line excitations as amplified in the reading amplifiers 24, are evaluated by the minimum detection circuit. A wire extending through all of the transfluxors serves to reset the connecting elements via the resetting generator 26.

Figure 4:
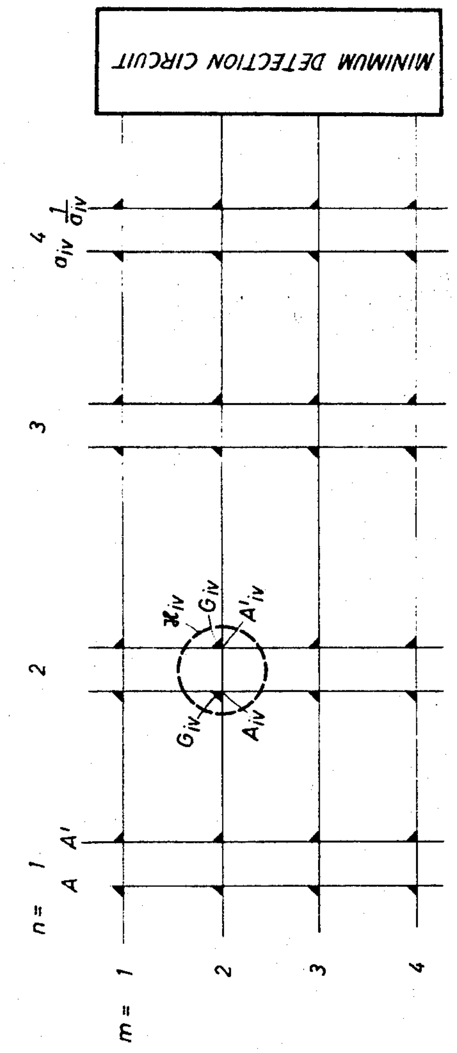
FIG. 4 shows a second example of a distinguishing matrix.

Another type of embodiment of a distinguishing matrix is schematically shown in FIG. 4. This arrangement again comprises double columns $A_v$ and $A'_v$. At the points of intersection between the columns $A_v$ and $A'_v$ and the row $B_i$, there are inserted the conductances $G_{iv}$ and $G'_{iv}$, both of which are being set during the learning phase. In the course of this, the attributes $a_{iv}$ of the pattern $\{a\}_i$ to be learned, are represented by direct voltages $a_{iv}$ volts, and are fed into the columns $A_v$. The reciprocal value of the attributes, that is $1/a_{iv}$ is applied to the columns $A'_v$. The conductances $G_{iv}$ and $G'_{iv}$ are then set in accordance with the following law of the constitution:

$$G_{iv}=k.a_{iv};\ G'_{iv}=k.\frac{1}{a_{iv}} \quad (11)$$

During the confirming phase, the attributes $a_{jv}$ of the offered pattern $\{a\}_j$ are applied to the columns $A'_v$, and the negative reciprocal value of the attributes, that is, $-1/a_{jv}$, is applied to the columns $A_v$. The resulting conductances are listed in Table II.

TABLE II

| | $G_{iv}$ | $G'_{iv}$ |
|---|---|---|
| Learning phase | $k.a_{iv}$ | $k.1/a_{iv}$ |
| Confirming phase | $-1/a_{jv}$ | $a_{jv}$ |

In this way, the energization contribution of each point of intersection between the columns $A_v$ or $A'_v$ and the row $B_i$ respectively, is a current $I_{iv}$:

$$I_{iv}=k.a_{jv}\cdot\frac{1}{a_{jv}}-k\cdot\frac{1}{a_{jv}}\cdot a_{iv}$$
$$=k\left(\frac{a_{jv}}{a_{iv}}-\frac{a_{iv}}{a_{jv}}\right) \quad (12)$$

and the total energization will become as follows:

$$I_i=k\sum_{v=1}^{n}\left(\frac{a_{jv}}{a_{iv}}-\frac{a_{iv}}{a_{jv}}\right);\ i=1,\ 2\ \ldots\ m \quad (13)$$

Also in this case, the current $I_i$ will become a minimum with respect to $\{a\}_i=\{a\}_j$, and the above will also apply to the maximum detection circuit. In this arrangement, the formation of the minimum is sharper than in the arrangement according to FIG. 2.

Figure 5:
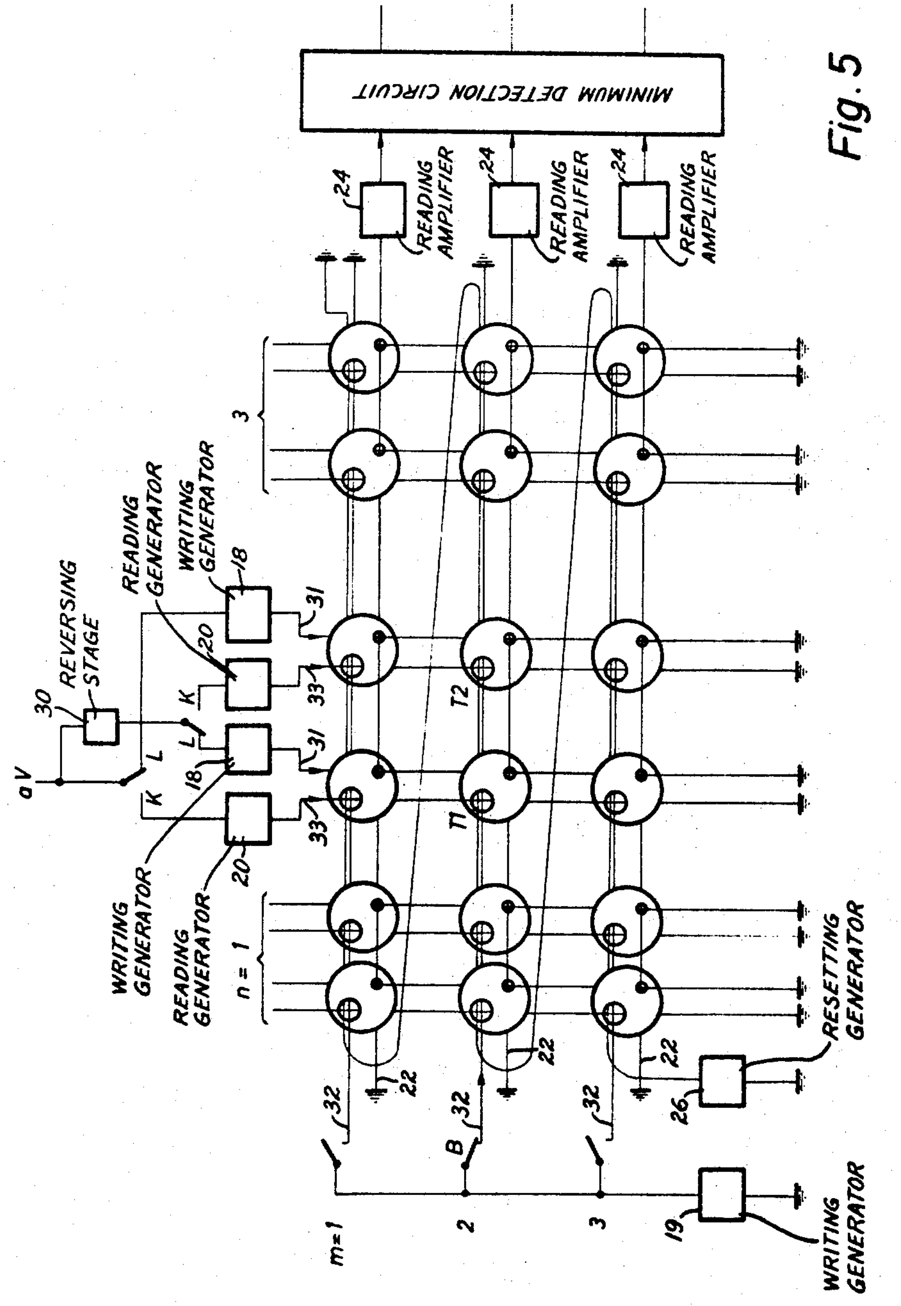
FIG. 5 shows a practical embodiment of the distinguishing matrix according to FIG. 4.

The distinguishing matrix according to FIG. 4 can be realized with the aid of an arrangement according to FIG. 5. Such an arrangement operates like the arrangement according to FIG. 3, with the difference that there is provided a reversing stage 30 whose output quantity is the reciprocal value of the input quantity, and thereby each time one column will receive the reciprocal value of the attribute as offered to the input side, as a control quantity.

Figure 6:
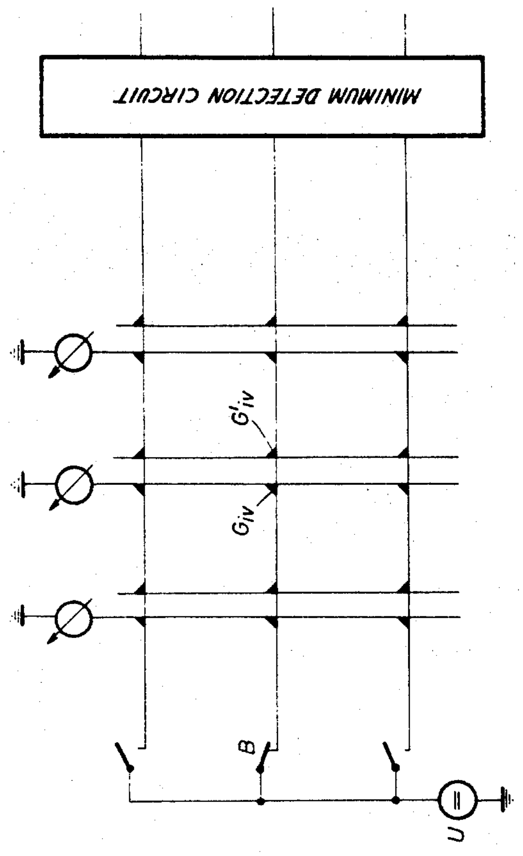
FIG. 6 shows a reversal of the distinguishing matrix.

It is also possible to operate the distinguishing matrix in the backward direction. Hence, there is carried out the inverted process: By stating the significance $b_i$, the pattern $\{a\}_i$ which was assigned during the learning phase, will be obtained at the columns of the distinguishing matrix. This will now be described with reference to FIG. 6 and with respect to the method shown in FIG. 2: A source of D.C. voltage $U_0$ with a low internal resistance is connected to the particular row whose stored pattern is supposed to be indicated. If the circuit is completed, e.g., via a current-measuring instrument, then, in each column, there will be flowing a current $I_{iv}$ which is in proportion to the attributes $a_{iv}$ of the learned pattern $\{a\}_i$ as stored in the *i*th row:

$$I_{iv}=U_0G_{iv}=a_{iv}.kU_0 \quad (14)$$

The currents $I_{iv}$ can be easily converted into proportional voltages $a_{iv}$ volt, so that D.C. voltages $a_{iv}$ volt which are in proportion to the attributes $a_{iv}$ of the "interrogated" patterns $\{a\}_i$, may be taken off at the output of the conversion circuit.

In the practical embodiments of a distinguishing matrix as shown and described hereinbefore, conductances were used as connecting elements, with the fed-in attributes having been represented by D.C. voltages, and with the excitations (energizations) having been represented by currents. In the same way it would also be possible to use ferromagnetic arrangements, especially ferrite cores and ribbon cores, hereinafter referred to as toroidal cores, as connecting elements. In this case, the inductions of the toroidal cores act as the connections; the fed-in attributes are represented by high-frequency currents with current amplitudes being in proportion to the amounts of the attributes, so that the excitations are effected by high-frequency voltages.

When using toroidal cores as connecting elements, the learning ability of the distinguishing matrix can be easily realized. The problem is seen in the necessity of having to adjust the connecting elements of one row automatically by the signals representing the attributes of a pattern, to a value which is in proportion to the quantities of the attributes to be learned into this particular row, i.e. in such a way that no disturbances will appear in the remaining connecting elements which are not to be adjusted or set. The method is capable of being carried out in an arrangement in which the states of induction of the toroidal cores are set by the coincidence of two phase-shifted high-frequency currents of different frequencies with the assistance of a feedback circuit.

Moreover, as connecting elements capable of being automatically set by the input signals, it is possible to use metallized paper, metallized foil or evaporated capacitors (with an evaporated dielectric and metal-coating). Likewise it is possible to use tantalum capacitors which are formed by a nonconducting surface layer in a tantalum electrolyte arrangement, as well as similar electro-chemical arrangements for serving as connecting elements. These arrangements, however, are only reversible within small limits, and are thus not suitable for all cases of practical application.

While I have described above the principles of my invention in connection with specific apparatus, it is to be clearly understood that this description is made only by way of example and not as a limitation to the scope of my invention, as set forth in the objects thereof and in the accompanying claims.

What is claimed is:

1. A system capable of learning, for distinguishing several patterns existing as analog signals, and capable of being assigned one or more pattern shapes or classes of significance, including: a matrix-type circuit arrangement comprising *m* rows and *n* double columns; connecting elements at the intersection of each row and column; first means for varying or changing during the learning phase the information-processing physical quantity stored in connecting elements of the first columns of the pairs of columns so that the information-processing physical quantity stored will become proportional to the applied attribute value, whereby a previously determined shape or significance is assigned to each row; second means for varying or changing during the confirming or learned phase the information-processing physical quantity stored in connecting elements of the second columns of said pairs of columns so that the stored value will become proportional to the applied attribute value of the offered pattern; said connecting elements acting commonly upon the row wire threaded therethrough during interrogation by the confirming stage to produce a signal representative of the difference between the stored and the offered attribute values; and means responsive to the sum of the value differences of each row for identifying the row of the smallest value.

2. Apparatus according to claim 1 wherein the second columns of said pairs of columns remain at a constant value during the application of said first means and in which a constant voltage is applied to the first columns of said pairs of columns to make the portion of its connecting element negative with respect to that of the second connecting element, during the application of said second means.

3. Apparatus according to claim 1 wherein the connecting effect produced by said first means in said first columns will be in direct proportion and in said second columns in inverse proportion to the attributes to be learned and in which the second means effects in said first columns the negative reciprocal of the attribute offered and in said second columns the attribute itself.

4. An arrangement according to claim 2 including means for applying an electrical signal to any row; and means responsive to said signal for selecting from the columns the values of the attributes learned into the said row during the learning phase.

5. An arrangement according to claim 3 including means for applying an electrical signal to any row; and means responsive to said signal for selecting from the columns the values of the attributes learned into the said row during the learning phase.

6. An arrangement according to claim 1 including means for setting all the connecting elements to the same level providing equality of conditions for the start of the learning process.

7. An arrangement according to claim 2 including means for setting all the connecting elements to the same level providing equality of conditions for the start of the learning process.

8. An arrangement according to claim 3 including means for setting all the connecting elements to the same level providing equality of conditions for the start of the learning process.

9. An arrangement according to claim 4 including means for setting all the connecting elements to the same level providing equality of conditions for the start of the learning process.

10. An arrangement according to claim 5 including means for setting all the connecting elements to the same level providing equality of conditions for the start of the learning process.

References Cited

UNITED STATES PATENTS

| | | | |
|---|---|---|---|
| 2,911,629 | 11/1959 | Wetzstein et al. | 340—174 |
| 2,973,508 | 2/1961 | Chadurjian | 340—146.2 |
| 3,031,650 | 4/1962 | Koerner | 340—174 |
| 3,105,959 | 10/1963 | Klinkhamer | 340—174 |
| 3,106,704 | 10/1963 | Eby | 340—174 |
| 3,126,527 | 3/1964 | McGuigan | 340—174 |
| 3,141,154 | 7/1964 | Hall | 340—174 |
| 3,206,735 | 9/1965 | Lee | 340—174 |
| 3,208,054 | 9/1965 | Kaiser et al. | 340—174 |
| 3,191,150 | 6/1965 | Andrews | 340—172.55 |
| 3,209,328 | 9/1965 | Bonner | 340—172.55 |

OTHER REFERENCES

Crafts, H. C.: Components That Learn and How To Use Them, in Electronics, pp. 49–53, Mar. 22, 1963.

PAUL J. HENON, *Primary Examiner.*

J. P. VANDENBURG, *Assistant Examiner.*